US006775078B2

(12) United States Patent
Jiang

(10) Patent No.: US 6,775,078 B2
(45) Date of Patent: Aug. 10, 2004

(54) FAST MAGNETO-RESISTIVE HEAD OPEN AND SHORT DETECTION FOR BOTH VOLTAGE AND CURRENT BIAS PREAMPLIFIERS

(75) Inventor: Hong Jiang, Milpitas, CA (US)

(73) Assignee: Texas Instruments Incorporated, Dallas, TX (US)

( * ) Notice: Subject to any disclaimer, the term of this patent is extended or adjusted under 35 U.S.C. 154(b) by 494 days.

(21) Appl. No.: 09/952,952

(22) Filed: Sep. 14, 2001

(65) Prior Publication Data

US 2003/0053239 A1 Mar. 20, 2003

(51) Int. Cl.$^7$ .............................. G11B 5/03; G01N 33/12
(52) U.S. Cl. .............................. 360/46; 360/66; 360/67; 360/75; 324/210; 324/212
(58) Field of Search ............................... 360/46, 66–67, 360/75, 313; 324/210, 212, 207.21

(56) References Cited

U.S. PATENT DOCUMENTS

| | | | | |
|---|---|---|---|---|
| 6,349,007 B1 | * | 2/2002 | Jiang ............................ | 360/31 |
| 6,377,411 B1 | * | 4/2002 | Katsumata et al. ............ | 360/46 |
| 6,473,251 B2 | * | 10/2002 | Patti et al. ..................... | 360/25 |
| 6,486,657 B2 | * | 11/2002 | Schroeder .............. | 324/207.21 |
| 6,636,049 B1 | * | 10/2003 | Lim et al. .................... | 324/537 |
| 6,700,719 B2 | * | 3/2004 | Iroaga et al. ................. | 360/46 |

FOREIGN PATENT DOCUMENTS

| JP | 06-325478 | * 11/1994 |
|---|---|---|
| JP | 07-153002 | * 6/1995 |

OTHER PUBLICATIONS

"Magnetoresistive Head Element Fault Detector", Sep. 1, 1980, IBM Technical Disclosure Bulletin, Volume No. 23; Issue No. 4, pp. 1660–1661.*
"MR Read Head Design", Oct. 1, 1987, IBM Technical Disclosure Bulletin, Volume No. 30; Issue No. 5, pp. 81–82.*

* cited by examiner

*Primary Examiner*—David Hudspeth
*Assistant Examiner*—Natalia Figueroa
(74) *Attorney, Agent, or Firm*—W. Daniel Swayze, Jr.; W. James Brady; Frederick J. Telecky, Jr.

(57) ABSTRACT

A circuit and method are presented for detecting a fault in a magneto-resistive head (18). The circuit includes a bias circuit (50) to produce a bias voltage across the head (18) and a pair of resistors (68,70) in series with the head (18) connected to the bias circuit (50) to carry a current ($I_{VMR}$) from the bias circuit (50) in common with the head. A circuit (102,102') is provided to determine a ratio of a voltage across the head (18) with respect to a voltage across the head (18) and the pair of resistors (68,70), and a circuit (104,106, 104',106') is provided for indicating a fault if the ratio falls outside a predetermined range.

20 Claims, 3 Drawing Sheets

FAST MAGNETO-RESISTIVE HEAD OPEN AND SHORT DETECTION FOR BOTH VOLTAGE AND CURRENT BIAS PREAMPLIFIERS

BACKGROUND OF INVENTION

1. Field of Invention

This invention relates to improvements in methods and apparatuses for dynamic information storage or retrieval, and more particularly to improvements in methods and circuitry for detecting electrical resistance in electronic components, especially for detecting open and short faults in magneto-resistive read heads of mass data storage devices, hard disk drives, or the like.

2. Relevant Background

Mass data storage devices include tape drives, as well as hard disk drives that have one or more spinning magnetic disks or platters onto which data is recorded for storage and subsequent retrieval. Hard disk drives may be used in many applications, including personal computers, set top boxes, video and television applications, audio applications, or some mix thereof. Applications for hard disk drives are still being developed, and are expected to further increase in the future.

Typically, mass data storage devices include a data transducer, or head, that is used to read data from and write data to a rotating magnetic media, usually in the form of a disk or platter on which a material containing orientable magnetic domains is carried. The present invention pertains especially to magneto-resistive data transducers, or heads, which change in resistivity in the presence of magnetic fields adjacent the disk produced by selectively oriented magnetic domains in the magnetic material on the disk. The typical resistance of a magneto-resistive head is in the range of between about 16 and 150 ohms.

Sometimes, however, the head mechanism experiences faults, the faults of interest herein being open and short faults. Efforts have been made to detect such open and short faults; however, such efforts have required that the read head be biased by electrical current, not voltage, and that both the open and short detection thresholds for head resistance vary over bias level.

Typically in the initial setup of a mass data storage device, and, hard disk drive in particular, the drive is provided with a serial port through which the user may program various user programmable parameters of the device. In the case of a voltage mode operated MR head circuit, to which the circuit and method of the invention best address, oftentimes the user is enabled to program the operating bias voltage at which the MR head is to be operated. In such situations, if the head has a "short" condition, the bias circuit associated with the head must supply relatively large currents to the head to maintain the preprogrammed bias voltage across the head. This may result in a saturation of the driving transistor. In the past, such saturation has frustrated the accurate detection of the short condition.

Moreover, in such voltage bias embodiments, the bias circuit typically operates to maintain a constant voltage across the MR head. Because the bias circuit usually employs a servo circuit to maintain the constant head voltage which requires a finite amount of time to restore the voltage across the head if a change of voltage bias level or a switch from one MR head and disk to another occurs. In the past, during this settling time, detection of head faults was difficult and inaccurate.

What is needed, therefore, is a relatively simple and reliable circuit and method for detecting open and short conditions in a circuit element, such as a magneto-resistive data transducer or head, in which the open and short fault conditions can be detected independently of the head bias for voltage bias preamplifiers.

SUMMARY OF INVENTION

In light of the above, therefore, it is an object of the invention to provide a circuit and method for detecting open and short fault conditions in a circuit element, such as a magneto-resistive (MR) data transducer, head, or the like.

One of the advantages of the circuit used in accordance with a preferred embodiment of the invention described below is that an open or short head condition can be detected independently of the voltage or current bias level on the head.

Another advantage of the invention is that the circuit of the invention has no component saturation limit during short detection for voltage biased preamplifiers.

Yet another advantage of the invention is that the fault detection circuit has fast fault detection and does not require that the servo loop of the biasing circuit settle to a steady state operating mode before fault detection can be performed. This advantage has significant value due to the frequent occurrence, in practice of normal usage, of MR head switching among disks or platters and of voltage or current bias switching under the same MR head and disk.

Still another advantage of the invention is that the fault detection circuit responds rapidly to fault changes, and, particularly to changes in the circuit without regard to the speed at which the servo circuit responds to maintain a constant voltage up across the head.

Still yet another advantage of the invention is that the fault detection circuit works for both voltage and current modes of operation of a head bias preamplifier.

These and other objects, features and advantages of the invention will be apparent to those skilled in the art from the following detailed description of the invention, when read in conjunction with the accompanying drawings and appended claims.

The present invention is based upon the observation that the voltage dropped across the MR head forms a ratio with the voltage dropped across the series combination of the resistors in the circuit containing the MR head. If a deviation from a normal ratio drops an indication is given that the voltage across the MR head is high, indicating an "open" fault. On the other hand, if the ratio becomes very small, an indication is given that the voltage across the MR head is very small, indicating that a "short" fault. The voltage ratio is essentially independent of the state of the servo circuit. Even though the servo circuit may have not settled to a final value, the ratio of the series combination of resistors remains substantially constant, and, therefore, faults of the head can be determined without regard to the condition servo loop.

Thus, through use of the circuit and methods of the invention, faults of read MR. head in hard disk drive can be reliably and promptly detected for both voltage- and current bias preamplifier chips, and the detection threshold is independent of head bias voltage or current. This invention is simple in circuit implementation, and takes advantage of using the existing MR head biasing circuit. Moreover, fast MR open or short detection can be made before the voltage bias loop settles down. The detection is independent of bias modes (voltage or currents), and the threshold is independent of voltage or current bias level. The simplicity of circuit implementation results in little or no impact on the thermal noise, power supply noise rejection, read signal path bandwidth, head-to-head switching, or read head circuit performance.

According to a broad aspect of the invention, a circuit is presented for detecting a fault in a magneto-resistive head. The circuit includes a bias circuit to produce a bias voltage across the head and at least one resistor in series with the head connected to the bias circuit to carry a current from the bias circuit in common with the head. In practice, this is often part of the existing MR head bias circuitry. A circuit is provided to determine a ratio of a voltage across the head with respect to a voltage across the head and the at least one resistor, and a circuit is provided for indicating a fault if the ratio falls outside a predetermined range. The circuit may be used in conjunction with bias circuits in either voltage or current biasing mode. The fault indicating circuit may include a differential comparator having two differential inputs. A voltage related to the voltage across the head and the at least one resistor less a voltage offset is applied to the differential inputs, and a circuit is provided for biasing the differential inputs with a voltage related to the voltage across the head. A circuit is connected to the differential comparator to produce a fault indicating output if a current in one side of the differential comparator is of magnitude that is outside a predetermined range.

According to another broad aspect of the invention, a circuit is provided for detecting a fault in a magneto-resistive head. The circuit includes a servo bias circuit to produce a constant bias voltage across the head and a pair of resistors in series with respective opposite sides of the head connected to the bias circuit to carry a current from the servo bias circuit in common with the head. A circuit is provided for determining a ratio of a voltage across the head with respect to a voltage across the head and the pair of resistors, and a circuit is provided for indicating a fault if the ratio falls outside a predetermined range. The circuit for indicating a fault may include a differential comparator having a differential inputs, wherein a voltage related to the voltage across the head and the at least one resistor less a voltage offset is applied to the differential inputs. A circuit is provided for biasing the differential inputs with a voltage related to the voltage across the head, and a circuit is provided for producing a fault indicating output if a current in one side of the differential comparator is of magnitude that is outside a predetermined range. The circuit for producing a fault comprises a circuit for producing an "open" fault if the magnitude is above a predetermined value and a "short" fault if the magnitude is below a predetermined value.

According to yet another broad aspect of the invention, a mass data storage device is presented. The mass data storage device includes a magneto-resistive head and a bias circuit to produce a bias voltage across the head. At least one resistor is connected in series with the head to carry a current from the bias circuit in common with the head. A circuit determines a ratio of a voltage across the head with respect to a voltage across the head and the at least one resistor, and a fault indicating circuit indicates a fault if the ratio falls outside a predetermined range.

According to still another broad aspect of the invention, a circuit is presented for detecting a fault in a magneto-resistive head for detecting magnetic fields in a data storage device. The circuit includes means for determining a ratio of a head voltage with respect to a voltage of a series of resistors in a current path in common with the head and means for triggering a fault indicating output signal if the ratio falls outside a predetermined range. The means for triggering a fault indicating output signal if the ratio falls outside a predetermined range may include means for triggering an open fault indicating signal if the ratio exceeds a first predetermined ratio and means for triggering a short fault indicating signal if the ratio falls below a second predetermined ratio.

According to still yet another broad aspect of the invention, a method is presented for detecting a fault in a magneto-resistive head for detecting magnetic fields in a data storage device. The method includes determining a ratio of a head voltage with respect to a voltage of a series of resistors in a current path in common with the head and triggering a fault indicating output signal if the ratio falls outside a predetermined range.

BRIEF DESCRIPTION OF DRAWINGS

The invention is illustrated in the accompanying drawings, in which.

In the various figures of the drawing, like reference numerals are used to denote the same, like, or similar parts.

DETAILED DESCRIPTION OF THE PREFERRED EMBODIMENTS

Figure 1:
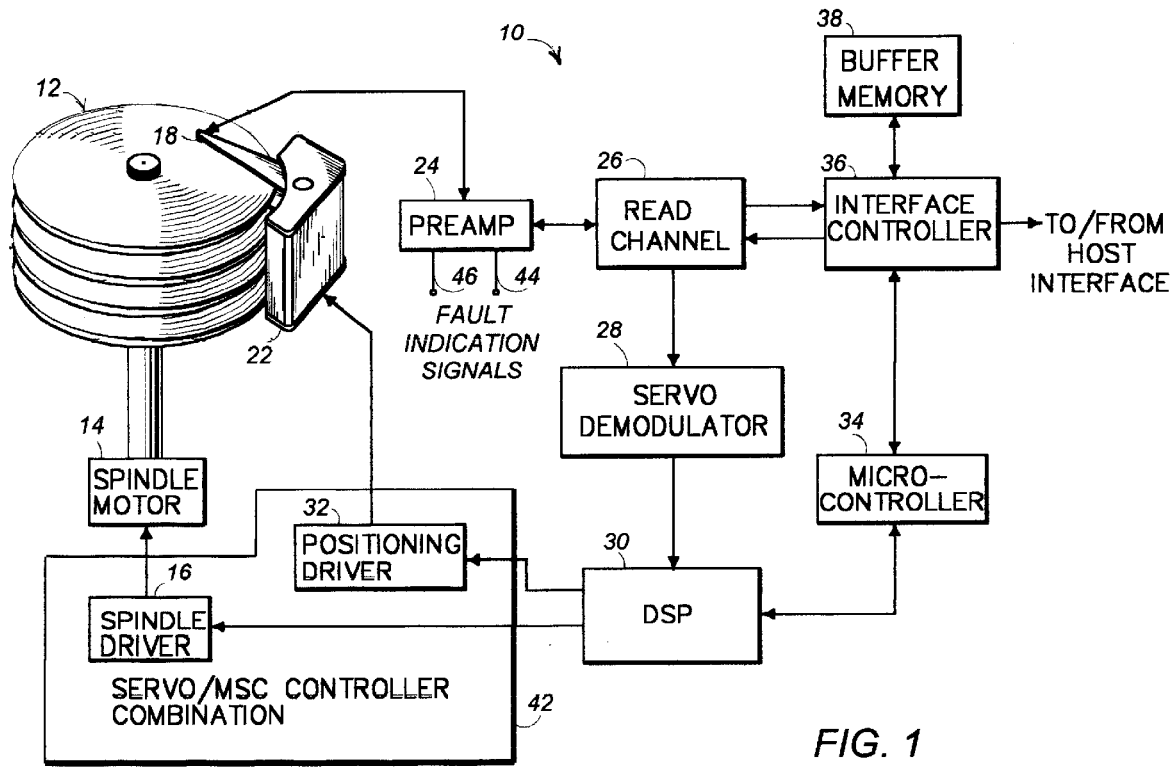
FIG. 1 is a block diagram of a generic disk drive system, illustrating the general environment in which the invention may be practiced.

The invention is illustrated in the accompanying drawings to which reference is now made. FIG. 1 is a block diagram of a generic disk drive system 10, which represents one general environment in which the invention may be practiced. The system 10 includes a magnetic media disk 12 that is rotated by a spindle motor 14 and spindle driver circuit 16.

A data read/write transducer or head 18 is locatable along selectable radial tracks (not shown) of the disk 12 by a voice coil motor 22. Preferably the data read/write transducer or head 18 is a magneto-resistive (MR) head, which changes in resistivity in the presence of a magnetic field.

The radial tracks may contain magnetic states that contain information about the tracks, such as track identification data, location information, synchronization data, as well as user data, and so forth. The head 18 may be used both to read user data back from the disk 12, as well as to detect signals that identify the tracks and sectors at which data is written, and to detect servo bursts that enable the head 18 to be properly laterally aligned with the tracks of the disk 12.

Analog electrical signals that are generated by the head 18 in response to the magnetic signals recorded on the disk 12 are preamplified by a preamplifier 24 for delivery to read channel circuitry 26. Servo signals, below described in detail, are detected and demodulated by one or more servo demodulator circuits 28 and processed by a digital signal processor (DSP) 30 to control the position of the head 18 via the positioning driver circuit 32. The servo data that is read and processed may be analog data that is interpreted by the DSP 30 for positioning the head 18.

A microcontroller 34 is typically provided to control the DSP 30, as well as an interface controller 36 to enable data to be passed to and from a host interface (not shown) in known manner. A data memory 38 may be provided, if desired, to buffer data being written to and read from the disk 12. Typically an "H" bridge writer is used to drive the signals from the interface controller 36, read channel 26 and preamplifier 24 to be written to the head 18.

According to a preferred embodiment of the invention, open and short faults of the write head 18 can be reliably detected to alert an operator or machine that a malfunction is occurring in the head. The term "open" is used herein to indicate a fault condition in which the resistance of the MR head in question exceeds a predetermined resistance. It does not necessarily require that the resistance be at or substantially at infinity. Likewise, the term "short" is used herein to indicate a fault condition in which the resistance of the MR head in question falls below a predetermined resistance. It does not necessarily require that the resistance be at or substantially at zero bias voltage.

Figure 2:
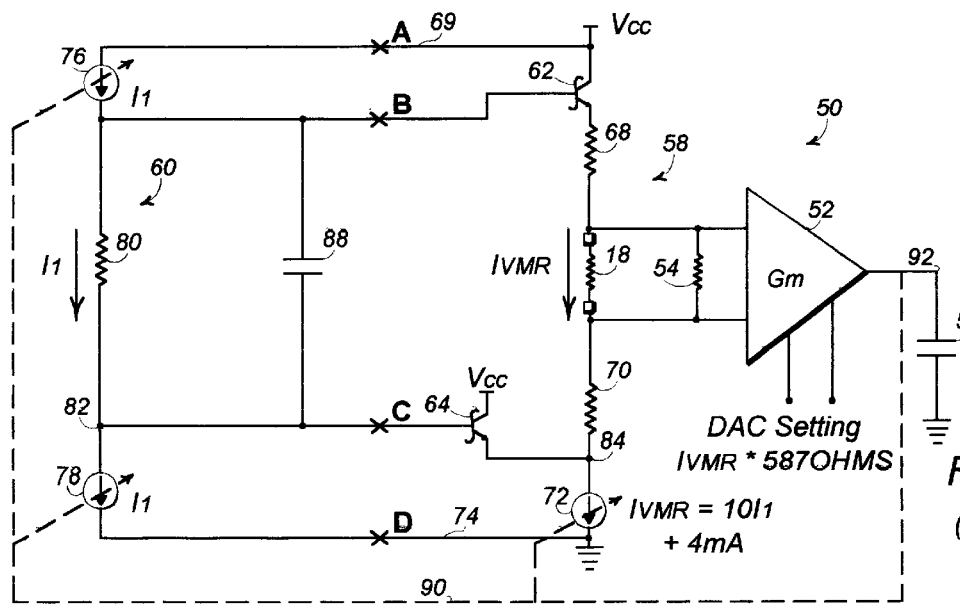
FIG. 2 is an electrical schematic diagram of a voltage mode MR head biasing circuit, in accordance with the prior art.

A typical prior art MR head driving circuit 50 is shown in FIG. 2, to which reference is now additionally made. The head voltage bias circuit 50 provides one environment in which the circuit and method of the invention may be employed. The circuit 50 includes a transconductance amplifier 52 that has one set of inputs across which the MR head 18 is connected. The transconductance amplifier 52 may be a full differential comparator, with the voltage across the MR head 18 providing one voltage input, and a reference voltage providing another voltage input. The reference voltage input may be established by a DAC, and may conveniently be set at a value of IVMR*587 Ohms. A resistance-matching resistor 54 may be provided in parallel with the MR head 18, as shown.

A capacitor 56 from which current can be supplied or sunk in the operation of the circuit 50 is connected between the output of the transconductance amplifier 52 and ground. The circuit 50 operates essentially as a servo loop to maintain a fixed predetermined as voltage on the MR head 18, in a manner below described in detail.

The circuit 50 includes two current paths 58 and 60. The current the path 60 provides a reference voltage to the transistors 62 and 64 to control the current in the current path 58. More particularly, the first current path 58 includes an npn transistor 62 in series with a resistor 68 on the top side of the MR head 18, connecting the MR head 18 to the Vcc supply line, 69. Similarly, the bottom side of the MR head 18 is connected by a resistor 70 and current source 72 to a reference or ground potential 74. The second current path 60 includes two current sources 76 and 78 connected in series with a resistor 80 between Vcc 69 and ground 74. The node 82 between the resistor 80 and current source 78 is connected to the base of the second npn transistor 64. The emitter of the second npn transistor 64 is connected to a node 84 between the resistor 70 and current source 72. A capacitor 88 is connected between the respective bases of transistors 62 and 64, as shown.

The current sources 72, 76, and 78 are adjustable by the current supplied by the output of the transconductance amplifier 52, as denoted by the dashed line 90, to maintain the voltage on output node 92 at an essentially constant value. As a result, the circuit 50 operates to maintain a constant voltage across MR head 18. It should be also noted that because the circuit 50 serves as a servo circuit, a finite amount of time is required if a change occurs to restore the voltage across the MR head 18.

In operation, as the voltage on node 92 rises, current from the transconductance amplifier 52 tends to charge the capacitor 56. This has the effect of reducing the current IVMR flowing through the MR head 18, which, in turn, reduces the output current to the capacitor 56 from the transconductance amplifier 52. This, reduce the voltage on node 92 to the constant voltage. On the other hand, if the voltage on output node 92 begins to fall, current is sunk from the capacitor 56. This has the effect of increasing the current IVMR flowing through the MR head 18, which, in turn, increases the output current from the transconductance amplifier 52 to the capacitor 56, returning the output node 92 to its normal fixed voltage.

Figure 3:
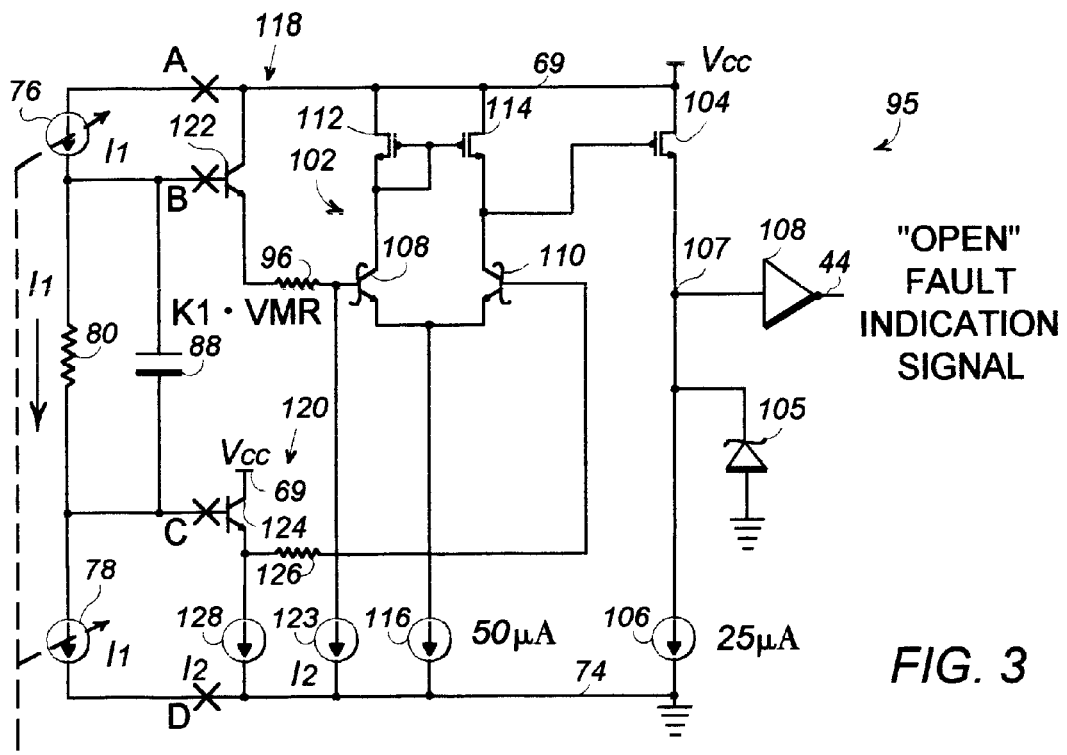
FIG. 3 is an electrical schematic diagram of an "open" fault detector circuit, in accordance with a preferred embodiment of the invention, for use in conjunction with the voltage mode MR head biasing circuit if FIG. 2.
Figure 4:
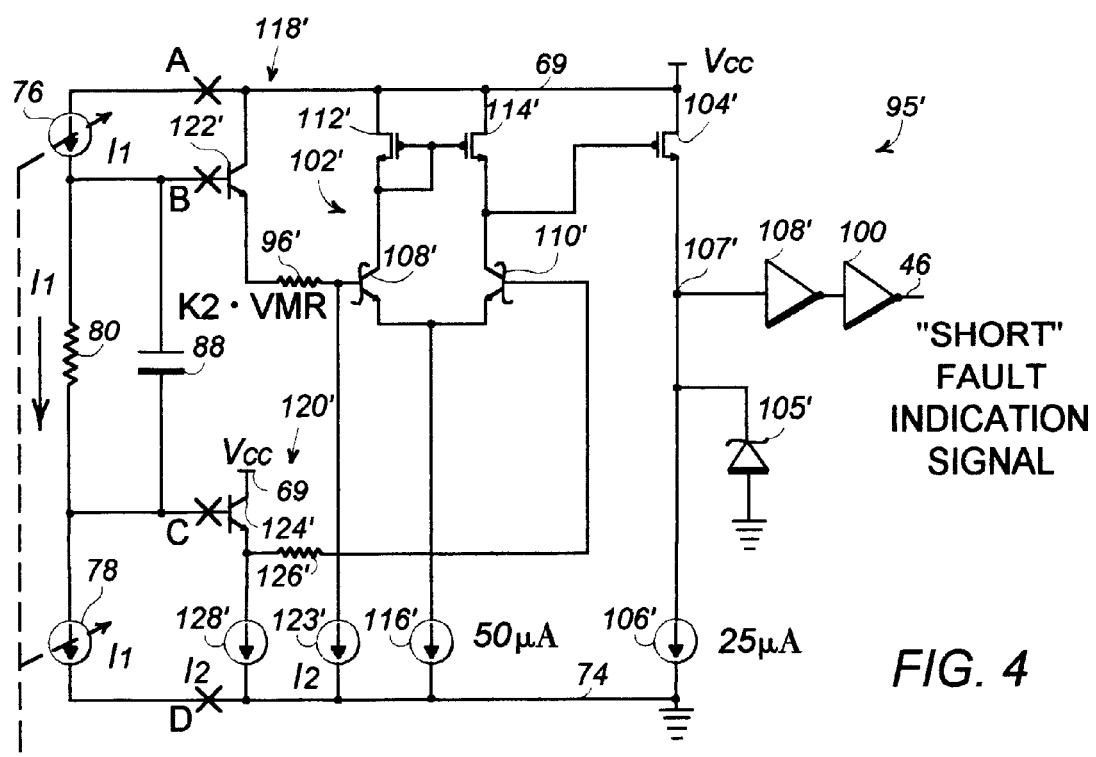
FIG. 4 is an electrical schematic diagram of a "short" fault detector circuit, in accordance with a preferred embodiment of the invention, for use in conjunction with the voltage mode MR head biasing circuit if FIG. 2.

According to a preferred embodiment of the invention, fault detection circuitry which is shown in FIGS. 3 and 4, to which reference is now additionally made, is connected essentially in parallel with a portion of the servo circuit 50 of FIG. 2 at the common connection points indicated by letters A, B, C, and D. The circuit 95 of FIG. 3 may be used to detect "open" faults of a magneto resistive head, the faults being indicated on output line 44. The circuit 95' of FIG. 4 may be used to detect "short" faults of a magneto resistive head, the faults being indicated on output line 44'. The circuits 95 and 95' are substantially the same, except for the value of the offset resistors 96 and 96', and the addition of a second inverter 100 at the output of the short detection circuit 95'.

More particularly, with reference first to FIG. 3, a differential comparator 102 is connected between the supply voltage rail, $V_{cc}$, 69, and the reference potential or ground line 74. The output from the differential comparator 102 is developed at the source of a MOSFET device 104, which is connected in series with a current source 106 between the supply voltage rail 69 and the ground line 74. A diode 105 is connected to the ground rail from the source of the PMOS transistor 104. The diode 105 insures that the output node 107 stays above ground.

The differential comparator 102 has two npn transistors 108 and 110, with respective MOSFET load transistors 112 and 114. A current source 116 is connected from the emitters of the npn transistors 108 and 110 to the ground rail 74. The current source 116 may be of current sourcing capability, for example, of twice the current sourcing capability of the current source 106.

The inputs to the differential comparator 102 are provided by similar npn transistor circuits 118 and 120. The npn transistor circuit 118 includes an npn transistor 122 and resistor 96 connected between the supply rail 69 and the base of the npn transistor 108. A current source 123 is connected between the base of the transistor 108 and the ground rail 74. Similarly, an npn transistor 124 is connected in series with a resistor 126 between the supply rail 69 and the base of the npn transistor 110. A current source 128 is connected between the emitter of transistor 124 and the ground rail 74.

The current sources 123 and 128 source a current of value $I_2$, which is derived from the voltage across the MR head 18 by circuitry described below in detail with reference to FIGS. 5 and 6. Thus, the voltages applied to the bases of transistors 108 and 110 include a head voltage component to enable the voltage ratio to be developed to detect the fault condition of the MR head, also as below described.

The inputs to the transistors 122 and 124 are provided by the voltage that is dropped across the input resistor 80, which is connected between the supply rail 69 and ground rail 74 in series with variable current sources 76 and 78. The capacitor 88 is connected in parallel with the resistor 80; consequently, the input voltage to the transistors 122 and 124 also appears across the capacitor 88. (The current sources 76 and 78, the resistor 80 and capacitor 88 are the same components described in the servo circuit of FIG. 2 above.)

As mentioned, the invention is based upon the observation that the voltage dropped across the MR head 18 forms a ratio with the voltage dropped across the series combination of the resistor 68, MR head 18, and resistor 70. If, for example, if a normal ratio of the MR/V 68, 18, 70 is one third, if the ratio drops to, for example, 1/1, an indication is given that the voltage across the MR head 18 is high, from this is can be concluded that an "open" fault exists in the MR head 18. On the other hand, if the ratio becomes very small, for example, on the order of 1/20, the voltage across the MR head 18 is very small. From this, it can be concluded that a "short" fault exists in the MR head 18. It should be observed that the voltage ratio as described is essentially independent of the state of the servo circuit 50. Thus, even though the servo circuit 50 may have not settled to a final value, the ratio of the series combination of resistors 68, 18, and 70 would remain substantially constant, and, therefore, faults of the head can be determined without regard to the condition servo loop 50.

In operation, the differential comparator 102 of the circuit 95 divides the current of the current source 116 between the npn transistors 108 and 110. When the resistance of the MR head 18 is normal, the ratio of VMR/VR68,R18,R70 is established at a "normal" ratio, for example, 1/3. (The value of the resistor 126 may be set to a very small balancing value, since it conducts only the base current of transistor 110.) At the desired "normal" ratio, the voltage at the output node 107 is set to zero by selection of an appropriate resistance value of the offset resistor 96. At the "normal" ratio, the current conducts primarily through the left npn transistor 108, so that the voltage applied to the gate of the PMOS device 104 is low. This produces a normally high state on the output node 107, which, in turn produces a normally low state on the output line 44.

If the resistance of the MR head increases, in order for the voltage value across the MR head to remain constant, a smaller current is produced by the servo circuit 50 through the series combination of resistor 68, MR head 18, and resistor 70. The voltage drop across the series combination of resistor 68, MR head 18, and resistor 70 therefore decreases. Thus, the ratio of the voltage across the MR head 18 to the series combination of resistor 68, MR head 18, and resistor 70 decreases. The decreased voltage ratio changes the current distribution in the differential comparator 102, increasing the voltage on the gate of the PMOS transistor 114. This causes the voltage on the normally high output node 107 to fall. When the voltage on the output node 107 falls below the threshold of the output inverter 128 (which may conveniently be a comparator, or similar circuit), the output on line 44 changes from low to high, indicating an open fault of the MR head 18.

To establish the "normal" ratio, the value of resistor 96 is selected to produce the desired voltage on the output node 107. Thus, in the embodiment shown, the value of the resistor is selected to drop a voltage of K1×VMR, where K1 is a ratio of the voltage across the MR head 18 to the series combination of resistor 68, MR head 18, and resistor 70, and VMR is the voltage across the head. Typical values for K are shown in Table 1 below. As will become apparent, the values of K in Table 1 represent a fraction, typically ⅕, of the ratio of the voltage across the MR head 18 to the series combination of resistor 68, MR head 18, and resistor 70. This is because the normal operation of the circuit that is typically provided by manufacturers to customers to generate the voltage value across the MR head for monitoring the voltage divides the head voltage by five. The monitoring circuit is shown and described in FIG. 5 below. Thus, according to Table 1, a value of K to produce an open threshold value may be, for example, 1.28 for an MR head resistance of 100 ohms. This sets the open fault threshold for the inverter 108 to correspond to a head resistance of 100 ohms.

The operation of the short fault detection circuit 95' shown in FIG. 4 is similar. However, as mentioned, the value of the offset resistor 96' is set differently at a value of K2 times the voltage across the MR head. Since the circuit detects a "short" value, the K2 selected may be selected to be 11, which corresponds to a head resistance of 10 ohms. This sets the short fault threshold for the inverter 108' to correspond to a head resistance of 10 ohms.

In order to invert the output signal so that both the open and short fault conditions produce a change from normally low to a high state, a second inverter 100 is provided in the short fault detecting circuit 95' to produce the low to high transitioning fault indicating signal on output line 46.

TABLE 1

| $R_{MR}$ (ohms) | K |
| --- | --- |
| 350 (open) | 0.509 |
| 300 | 0.560 |
| 277 | 0.593 |
| 250 | 0.632 |
| 200 | 0.740 |
| 150 | 0.920 |
| 100 | 1.28 |
| 50 | 2.36 |
| 30 | 3.80 |
| 25 | 4.70 |
| 20 | 5.60 |
| 15 | 7.40 |
| 12 | 9.20 |
| 10 | 11.0 |
| 8 | 13.7 |
| 6 (short) | 18.2 |

Figure 6:
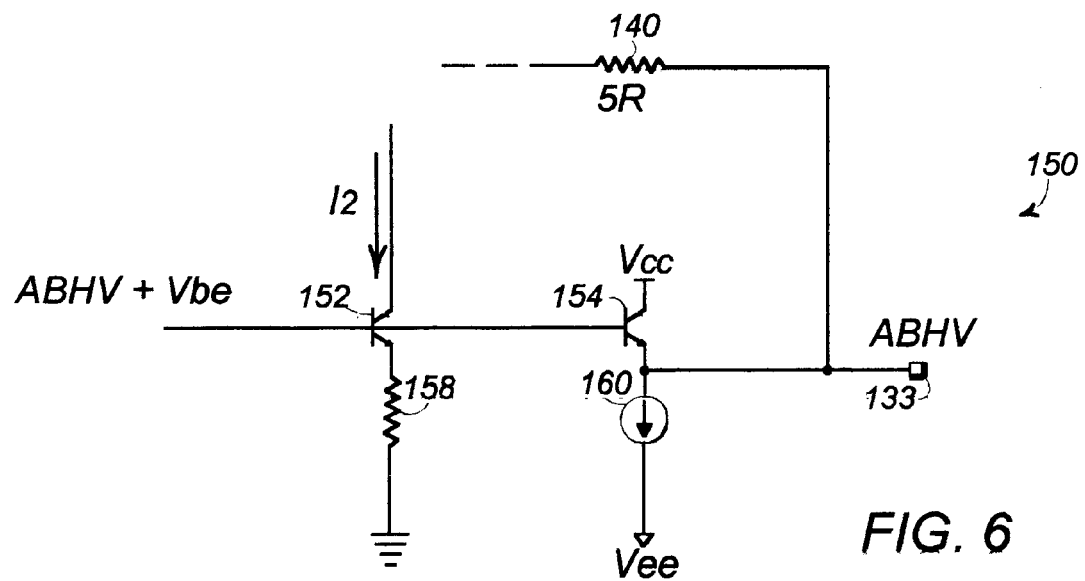
FIG. 6 is an electrical schematic diagram of a circuit used in conjunction with the circuit of FIG. 5 to provide a current for use in the circuits of FIGS. 3 and 4 representing the MR head voltage, in accordance with a preferred embodiment of the invention.

In order to develop a reference that may be used to represent the voltage across the MR head, a circuit, such as the circuit 150 shown in FIG. 6 may be used. The circuit 150 of FIG. 6 develops a current $I_2$ that may be mirrored to provide currents in current sources 128, 123, 128' and 123' in the circuits of FIGS. 3 and 4.

More particularly, typically manufacturers of mass data storage devices provide a circuit that can be used by users that indicates an analog buffered head voltage (AMHV), which is developed from the MR head voltage. A typical such circuit 130 is shown in FIG. 5, to which reference is now additionally made. The circuit 130 includes a differential comparator 131 that receives the MR head voltage across its input terminals 132 and 132 via resistors 136 and 138. The output from the differential comparator 131 is developed between an output pad 133 and ground. Feedback resistors 140 and 142 connect the respective outputs and inputs to scale the output voltage. In the embodiment shown, the output voltage is 1/5 the input voltage.

Figure 5:
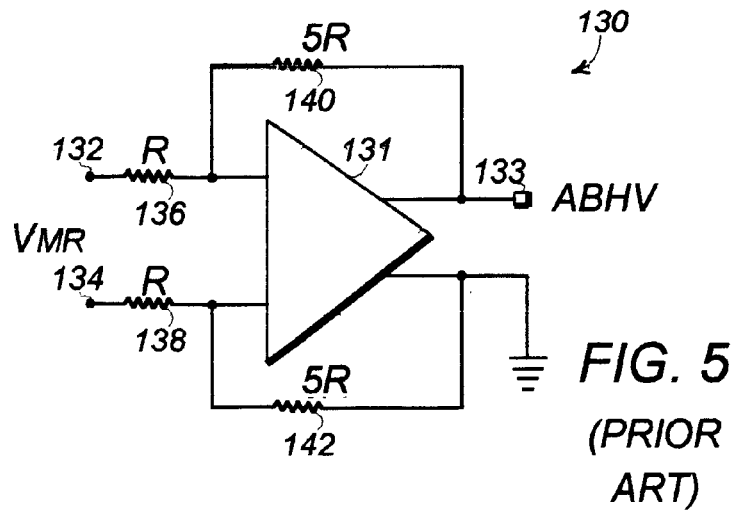
FIG. 5 is an electrical schematic diagram of a circuit for providing a user an indication of the analog buffered head voltage across an MR head, in accordance with the prior art.

The circuit 150 of FIG. 6 has two npn transistors 152 and 154 that may be used in conjunction with the circuit of FIG. 5, and, more particularly, in series with the output line from the comparator 131 and pad 133. A resistor 158 is connected between the emitter of transistor 152 and ground, and a current source 160 is connected between the emitter of transistor 154 and $V_{ee}$. The feedback resistor 140 is connected back to the input of the comparator 131 in the manner shown in FIG. 5. The ABHV output on pad 133 is developed on the emitter of emitter-follower connected transistor 154. The current I2 that flows through transistor 152, which is controlled by the voltage ABHV, is related to the MR head voltage, and can be mirrored, as mentioned, to the circuits of FIGS. 3 and 4.

It should be noted that although the embodiment of the invention described is best suited for use with a voltage mode biased MR head, it can be also be advantageously employed with a current mode biased MR head. Since in the current mode head biasing circuits the current flowing through the MR head are known and controllable, however, the problems of determining head faults may not be as difficult to address in current mode systems.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A circuit for detecting a fault in a magneto-resistive head, comprising:
   a bias circuit to produce a bias voltage across said head;
   at least one resistor in series with said head connected to said bias circuit to carry a current from said bias circuit in common with said head;
   a circuit for determining a ratio of a voltage across said head with respect to a voltage across said head and said at least one resistor;
   and a circuit for indicating a fault if said ratio falls outside a predetermined range.

2. The circuit of claim 1 wherein said bias circuit biases said head to operate in a voltage mode, and wherein said bias circuit maintains a constant voltage across said head.

3. The circuit of claim 1 wherein said at least one resistor comprises a pair of resistors on respective opposite sides of said head.

4. The circuit of claim 1 wherein said circuit for indicating a fault comprises:
   a differential comparator having a differential inputs;
   wherein a voltage related to said voltage across said head and said at least one resistor less a voltage offset is applied to said differential inputs;
   a circuit for biasing said differential inputs with a voltage related to said voltage across said head;
   and a circuit for producing a fault indicating output if a current in one side of said differential comparator is of magnitude that is outside a predetermined range.

5. The circuit of claim 4 wherein said circuit for producing a fault comprises a circuit for producing an "open" fault if said magnitude is above a predetermined value.

6. The circuit of claim 4 wherein said circuit for producing a fault comprises a circuit for producing a "short" fault if said magnitude is below a predetermined value.

7. A circuit for detecting a fault in a magneto-resistive head, comprising:
   a servo bias circuit to produce a constant bias voltage across said head;
   a pair of resistors in series with respective opposite sides of said head connected to said bias circuit to carry a current from said servo bias circuit in common with said head;
   a circuit for determining a ratio of a voltage across said head with respect to a voltage across said head and said pair of resistors;
   and a circuit for indicating a fault if said ratio falls outside a predetermined range.

8. The circuit of claim 6 wherein said circuit for indicating a fault comprises:
   a differential comparator having a differential inputs;
   wherein a voltage related to said voltage across said head and said at least one resistor less a voltage offset is applied to said differential inputs;
   a circuit for biasing said differential inputs with a voltage related to said voltage across said head;
   and a circuit for producing a fault indicating output if a current in one side of said differential comparator is of magnitude that is outside a predetermined range.

9. The circuit of claim 8 wherein said circuit for producing a fault comprises a circuit for producing an "open" fault if said magnitude is above a predetermined value.

10. The circuit of claim 8 wherein said circuit for producing a fault comprises a circuit for producing a "short" fault if said magnitude is below a predetermined value.

11. A mass data storage device, comprising:
    a magneto-resistive head;
    a bias circuit to produce a bias voltage across said head;
    at least one resistor in series with said head connected to said bias circuit to carry a current from said bias circuit in common with said head;
    a circuit for determining a ratio of a voltage across said head with respect to a voltage across said head and said at least one resistor;
    and a circuit for indicating a fault if said ratio falls outside a predetermined range.

12. The circuit of claim 11 wherein said bias circuit biases said head to operate in a voltage mode, and wherein said bias circuit maintains a constant voltage across said head.

13. The circuit of claim 11 wherein said at least one resistor comprises a pair of resistors on respective opposite sides of said head.

14. The circuit of claim 11 wherein said circuit for indicating a fault comprises:
    a differential comparator having a differential inputs;
    wherein a voltage related to said voltage across said head and said at least one resistor less a voltage offset is applied to said differential inputs;
    a circuit for biasing said differential inputs with a voltage related to said voltage across said head;
    and a circuit for producing a fault indicating output if a current in one side of said differential comparator is of magnitude that is outside a predetermined range.

15. The circuit of claim 14 wherein said circuit for producing a fault comprises a circuit for producing an "open" fault if said magnitude is above a predetermined value.

16. The circuit of claim 14 wherein said circuit for producing a fault comprises a circuit for producing a "short" fault if said magnitude is below a predetermined value.

17. A circuit for detecting a fault in a magneto-resistive head for detecting magnetic fields in a data storage device, comprising:

means for determining a ratio of a head voltage with respect to a voltage of a series of resistors in a current path in common with said head;

and means for triggering a fault indicating output signal if said ratio falls outside a predetermined range.

18. The circuit of claim 17 wherein said means for triggering a fault indicating output signal if said ratio falls outside a predetermined range comprises:

means for triggering an open fault indicating signal if said ratio exceeds a first predetermined ratio;

and means for triggering a short fault indicating signal if said ratio falls below a second predetermined ratio.

19. A method for detecting a fault in a magneto-resistive head for detecting magnetic fields in a data storage device, comprising:

determining a ratio of a head voltage with respect to a voltage of a series of resistors in a current path in common with said head;

and triggering a fault indicating output signal if said ratio falls outside a predetermined range.

20. The method of claim 19 wherein said triggering a fault indicating output signal if said ratio falls outside a predetermined range comprises:

triggering an open fault indicating signal if said ratio exceeds a first predetermined ratio;

and triggering a short fault indicating signal if said ratio falls below a second predetermined ratio.

* * * * *